(12) United States Patent
Trangbaek et al.

(10) Patent No.: US 9,628,001 B2
(45) Date of Patent: Apr. 18, 2017

(54) METHOD AND APPARATUS FOR MEASUREMENT AND CONTROL OF LINEAR ACTUATOR

(71) Applicants: GM GLOBAL TECHNOLOGY OPERATIONS LLC, Detroit, MI (US); AALBORG UNIVERSITY, Aalborg (DK)

(72) Inventors: Klaus Trangbaek, Moshav ein Vered (IL); Vladimir Suplin, Modin (IL); Rasmus Koldborg Holm, Aalborg (DK); Nick Ilso Berg, Aalborg (DK); Peter Omand Rasmussen, Norresundby (DK)

(73) Assignees: GM GLOBAL TECHNOLOGY OPERATIONS LLC, Detroit, MI (US); AALBORG UNIVERSITY, Aalborg (DK)

( * ) Notice: Subject to any disclaimer, the term of this patent is extended or adjusted under 35 U.S.C. 154(b) by 148 days.

(21) Appl. No.: 14/715,924

(22) Filed: May 19, 2015

(65) Prior Publication Data
US 2016/0344312 A1    Nov. 24, 2016

(51) Int. Cl.
*H02K 41/00*  (2006.01)
*H02P 1/00*  (2006.01)
(Continued)

(52) U.S. Cl.
CPC .............. *H02P 6/006* (2013.01); *H02K 1/27* (2013.01); *H02K 7/06* (2013.01); *H02K 7/1163* (2013.01); *H02K 11/215* (2016.01)

(58) Field of Classification Search
CPC .......... H02P 6/006; H02K 11/215; H02K 1/27
(Continued)

(56) References Cited

U.S. PATENT DOCUMENTS 5,079,458 A    1/1992 Schuster
5,990,587 A    11/1999 Shimanovich et al.
(Continued)

OTHER PUBLICATIONS

U.S. Appl. No. 14/106,963, filed Dec. 16, 2013, Avshalom Suissa.
(Continued)

*Primary Examiner* — Erick Glass

(57) ABSTRACT

An apparatus for controlling force of a magnetic lead screw actuator includes a magnetic lead screw actuator, an external control module and at least one sensor device integrated within the magnetic lead screw actuator. The magnetic lead screw actuator includes an electric machine, a rotor, and a translator. The rotor includes a rotor magnet assembly forming first helical magnetic threads along the rotor and the translator includes a translator magnet assembly forming second helical magnetic threads along the translator. Rotation of the rotor by the electric machine effects linear translation of the translator by interaction of the first and second helical magnetic threads. The external control module is electrically operatively coupled to an electric machine controller of the magnetic lead screw actuator. The at least one sensor device integrated within the magnetic lead screw actuator is configured to measure a parameter indicative of a relative displacement between the rotor and the translator and this parameter is provided as feedback to the electric machine controller.

20 Claims, 9 Drawing Sheets

(51) Int. Cl.

| | | |
|---|---|---|
| *H02P 3/00* | (2006.01) | |
| *H02P 5/00* | (2016.01) | |
| *H02P 6/00* | (2016.01) | |
| *H02K 1/27* | (2006.01) | |
| *H02K 7/06* | (2006.01) | |
| *H02K 7/116* | (2006.01) | |
| *H02K 11/215* | (2016.01) | |

(58) Field of Classification Search
 USPC .......................................................... 318/135
 See application file for complete search history.

(56) References Cited

U.S. PATENT DOCUMENTS

| | | | |
|---|---|---|---|
| 6,190,409 B1 | 2/2001 | Vitale | |
| 2001/0055947 A1 | 12/2001 | McCabe | |
| 2014/0288776 A1* | 9/2014 | Anderson | B60G 17/016 |
| | | | 701/37 |
| 2015/0224845 A1* | 8/2015 | Anderson | B60G 17/019 |
| | | | 701/37 |

OTHER PUBLICATIONS

U.S. Appl. No. 14/106,945, filed Dec. 16, 2013, Avshalom Suissa.
U.S. Appl. No. 14/106,982, filed Dec. 16, 2013, Klaus Trangbaek.
U.S. Appl. No. 14/181,667, filed Feb. 15, 2014, Klaus Trangbaek.
Lassen, S.E., et al., Application of a Magnetic Lead Screw and Permanent Magnet Synchronous Machine as an Active Suspension system for an Electric Vehicle, The 1st Student . . .
Symposium on Mechanical and Manufacturing Engineering, Jun. 2013, Aalborg University, Aalborg East, Denmark; http://www.m-tech.aau.dk.

\* cited by examiner

METHOD AND APPARATUS FOR MEASUREMENT AND CONTROL OF LINEAR ACTUATOR

TECHNICAL FIELD

This disclosure relates to devices for controlling and measuring magnetic lead screw actuators.

BACKGROUND

A magnetic lead screw actuator is a linear actuator which can be used to convert a rotational movement into a linear movement. Magnetic lead screw actuators can be used in applications known to require a linear actuator. A magnetic lead screw actuator may be used as a damper in an active suspension system.

Suspension systems absorb and dissipate vibration inputs, thus decoupling a sprung element from impulse and vibration energy inputs experienced at an unsprung element. Suspension systems are employed on both stationary systems and mobile systems including passenger vehicles. Known suspension system elements include spring elements coupled in parallel and/or in series with damping elements, e.g., shock absorbers that include fluidic or pneumatic energy absorbing and dissipating features.

When employed on a vehicle system, suspension systems including springs and dampers are configured to coincidently provide performance characteristics related to passenger ride comfort, vehicle handling and road holding capability. Ride comfort is generally managed in relation to spring constant of the main springs of the vehicle, spring constant of passenger seating, tires and a damping coefficient of the damper. For optimum ride comfort, a relatively low damping force for a soft ride is preferred. Vehicle handling relates to variation in a vehicle's attitude, which is defined in terms of roll, pitch and yaw. For optimum vehicle handling, relatively large damping forces or a firm ride are required to avoid excessively rapid variations in vehicle attitude during cornering, acceleration and deceleration. Road holding ability generally relates to an amount of contact between tires and the ground. To optimize road handling ability, large damping forces are required when driving on irregular surfaces to prevent loss of contact between individual tires and the ground. Known vehicle suspension dampers employ various methods to adjust damping characteristics to be responsive to changes in vehicle operational characteristics, including active damping systems.

Active damping control benefits from precise measurement of displacement position and velocity of the active damping system. Known suspension systems employ various methods to determine displacement position and velocity including the use of potentiometers and linear transducers.

SUMMARY

An apparatus for controlling force of a magnetic lead screw actuator includes a magnetic lead screw actuator, an external control module and at least one sensor device integrated within the magnetic lead screw actuator. The magnetic lead screw actuator includes an electric machine, a rotor, and a translator. The rotor includes a rotor magnet assembly forming first helical magnetic threads along the rotor and the translator includes a translator magnet assembly forming second helical magnetic threads along the translator. Rotation of the rotor by the electric machine effects linear translation of the translator by interaction of the first and second helical magnetic threads. The external control module is electrically operatively coupled to an electric machine controller of the magnetic lead screw actuator. The at least one sensor device integrated within the magnetic lead screw actuator is configured to measure a parameter indicative of a relative displacement between the rotor and the translator and this parameter is provided as feedback to the electric machine controller.

BRIEF DESCRIPTION OF THE DRAWINGS

One or more embodiments will now be described, by way of example, with reference to the accompanying drawings, in which.

DETAILED DESCRIPTION

Figure 1:
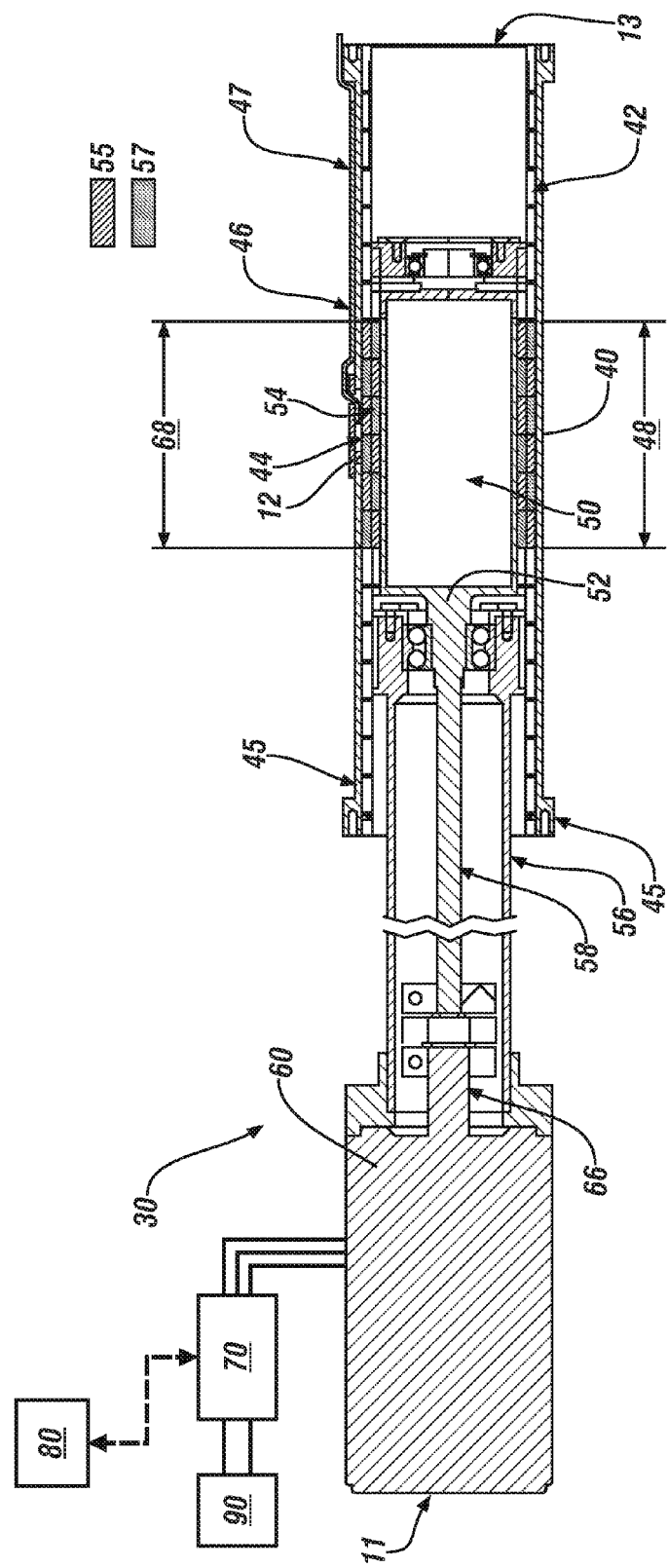
FIG. 1 illustrates a sectional view of an exemplary magnetic lead screw (MLS) actuator, in accordance with the disclosure.

Referring now to the drawings, wherein the showings are for the purpose of illustrating certain exemplary embodiments only and not for the purpose of limiting the same, FIG. 1 illustrates a sectional view of an exemplary magnetic lead screw actuator (MLS) 30.

MLS 30 rotatably couples in series with an electric motor 60. The MLS 30 is analogous to a mechanical lead screw wherein the mechanical coupling in the form of opposed helical threads is replaced by a functionally equivalent magnetic coupling in the form of radially polarized helical magnets having opposite polarity, as described herein. The MLS 30 includes a translator 40 and a rotor screw 50. As shown, the translator 40 is configured as a female translating portion of the MLS 30 and is analogous to a threaded nut. As shown, the rotor screw 50 is configured as a male rotating portion of the MLS 30 and is analogous to a threaded screw. Alternatively, the translator 40 can be configured as a translating male portion of the MLS 30 and the rotor screw 50 can be configured as a rotating female portion of the MLS 30. Rotation of the rotor screw 50 in the translator 40 causes a linear translation of the rotor screw 50 in relation to the translator 40 by interaction of helical magnetic threads. Rotation of the rotor screw 50 can be caused by rotation of the electric motor 60 acting as a motor responsive to electric energy input thereto. Rotation of the rotor screw 50 can be caused by compressive force or tensile force between external elements between which the MLS 30 and the motor 60 are positioned. A first external element may be positioned at a first end 11 of MLS 30, and a second external element may be positioned at a second end 13 of MLS 30 such that MLS 30 is positioned between the external elements along a translating axis. The compressive force or tensile force between the external elements causes the rotor screw 50 to rotate within the translator 40 with corresponding rotation of the electric motor 60. The electric motor 60 may act as a generator in such circumstances to harvest electric power. Rotation of the rotor screw 50 either increases or decreases a linear distance between the external elements depending upon the direction of rotation, with an accompanying tensile or compressive force that is dependent upon the forces acting on the external elements. Thus, linear translation of the rotor screw 50 in relation to the translator 40 adjusts displacement of the external elements.

The translator 40 includes a translator magnet assembly 44 fabricated on an inner surface of a cylindrically-shaped annular frame 42. The translator magnet assembly 44 includes a plurality of permanent magnet elements arranged to form a continuous helical magnetic thread. The translator magnet assembly 44 is arranged as a plurality of interleaved magnet sections forming a spirally-wound thread formed from radially polarized magnets of opposite polarity. Polarities are shown merely for purposes of illustration of the concept, and include a north polarity portion 55 and a south polarity portion 57. The translator frame 42 includes a first end 45, a middle section 46, and a second end 47, wherein the first end 45 is proximal to the electric motor 60. In an exemplary embodiment, the translator magnet assembly 44 may completely extend axially along the translator frame 42 from the first end 45 to the second end 47. In another exemplary embodiment the permanent magnet element may be molded or sintered instead of being a plurality of discrete magnets.

The rotor screw 50 includes a rotor magnet assembly 54 fabricated on an outer surface of a cylindrically-shaped frame 52 that couples to a rotatable shaft 58 coupled to a rotor 66 of the electric motor 60. The rotatable shaft 58 is within an axial bearing house 56. The rotor magnet assembly 54 includes a plurality of permanent magnet elements each having north polarity portion 55 and south polarity portion 57 arranged to form a continuous helical magnetic thread having the same pitch as the helical magnetic thread of the translator magnet assembly 44. The rotor magnet assembly 54 is arranged as a plurality of interleaved permanent magnet sections forming a spirally-wound thread formed from radially polarized magnets of opposite polarity. The rotor frame 52 is preferably fabricated from iron or other ferromagnetic material in this embodiment. The rotor magnet assembly 54 is characterized by a rotor magnet axial length 68 and the translator magnet assembly 44 is characterized by translator magnet axial length 48. In one embodiment, the translator magnet axial length 48 is substantially equal to a length of the translator frame 42 and the rotor magnet axial length 68 is determined based upon a desired magnetic force coupling, which is determined in conjunction with diameters of the rotor screw 50 and the translator 40. Magnetic force coupling as defined and used herein refers to a magnitude of magnetic force exerted between two adjacent elements, e.g., the rotor 50 and the translator 40 of the MLS 30, and can be measured and indicated by a magnitude of linear force or rotational torque that is required to move one of the elements relative to the other element. Control of the linear force that is generated by the linear translation of the MLS 30 as the translator 40 translates along the rotor screw 50 requires a determination of the linear force being generated. The linear force may be determined as a function of a relative displacement of the MLS 30. The relative displacement may be determined as a function of the rotation of the rotor screw 50 and the translation of the translator 30 along the rotor screw 50. The integrated sensor devices 12 can be configured to measure magnetic flux in the MLS 30 which can be used in determining the relative displacement of the MLS 30 for use in determining and controlling the linear force exerted by the MLS 30.

The outer diameter of the rotor screw 50 and the inner diameter of the translator 40 are sized to fit concentrically one within the other without physical contact. The magnet fluxes of the elements align themselves to a null force position when no external forces are applied. Parameters that affect design of the magnetic force coupling include the diameters of the rotor screw 50 and the translator 40, thread pitch and clearance between the facing surfaces of the rotor magnet assembly 54 and the translator magnet assembly 44. The design of the magnetic force coupling may also be affected by the magnet thickness, the material the magnets are made from and the magnetization of the magnetic elements. Diameters are selected based upon a trade-off between surface area, affecting the magnetic force coupling between the magnets, and physical size affecting packaging and cost. Sensor devices 12 may be integrated within the MLS 30 to measure magnetic flux generated within the MLS 30. In an exemplary embodiment, and as illustrated, the integrated sensors may be configured to measure a magnetic flux generated by the rotor magnet assembly 54 and the translator magnet assembly 44. Thread pitch is selected based upon trade-offs between activation torque for the electric motor 60, and a desired rotational speed and corresponding response time as indicated by a time-rate change in length of the MLS 30 caused by rotation of the rotor screw 50 relative to the translator 40. The clearance between the facing surfaces of the rotor magnet assembly 54 and the translator magnet assembly 44 is selected based upon a trade-off between mechanical design considerations such as manufacturing and assembly tolerances and a desired magnetic force coupling. A magnetic lead screw has no mechanical contacts associated with vertical force transfer and hence has low friction and wear. Low friction forces and low wear increases reliability and reduces maintenance.

The electric motor 60 may be any suitable electric motor configuration capable of controlled rotation in both clockwise and counter-clockwise directions. Suitable electric motor configurations include a synchronous motor, an induction motor, or a permanent magnet DC motor. In one embodiment, the electric motor 60 is configured as a motor/generator. A motor controller 70 electrically connects to the electric motor 60 via electrical cables. The motor controller 70 includes suitable electrical devices including, e.g., power switches to transform electric power transferred between an electric power storage device (battery) 90 and the electric motor 60 in response to control commands originating from a controller 80. The electric motor 60 is configured to exert sufficient torque to overcome rotational inertia including the magnetic force coupling between the rotor magnet assembly 54 and the translator magnet assembly 44 to spin the rotor 50 at a rate that causes a change in length of the MLS 30 at a preferred rate, e.g., as measured in mm/msec. The controller 80 can be configured to receive feedback from the integrated sensor devices 12. The feedback may include a measurement of magnetic flux in the MLS 30 which may be used by the controller 80 to generate a control command based on achieving a desired linear force from MLS actuator 30. In an exemplary embodiment the sensor devices 12 may be Hall Effect sensors and controller 80 may be configured to interpret the measured data from the hall sensor and determine a relative displacement between the rotor screw 50 and the translator 40 of the MLS actuator 30. The controller 80 may additionally be configured to determine a magnetic lead screw force exerted by MLS actuator 30. In an exemplary embodiment the MLS actuator may additionally include a sensor device configured to measure a time derivative of the relative displacement between the rotor screw 50 and the translator 40. A sensor device configured to measure a time derivative of the relative displacement between the rotor screw 50 and the translator 40 may be a coil type sensor device. Calibration of the software of controller 80 to the specific MLS actuator 30 may be required. Variation in flux caused by temperature changes may be accounted for in the controller software.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2:
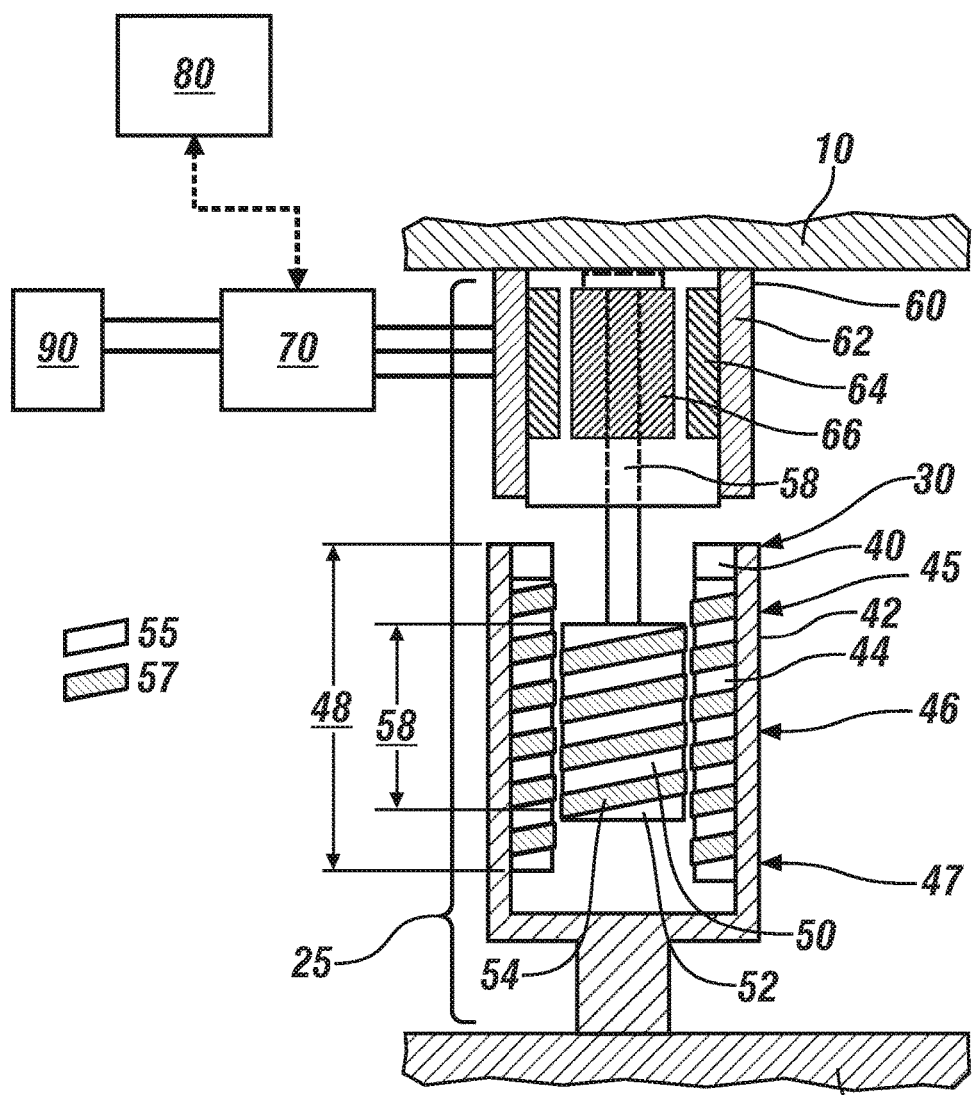
FIG. 2 illustrates a sectional view of a MLS actuator that is configured to provide vibration damping between a sprung element and an unsprung element in a suspension assembly, in accordance with the disclosure.

FIG. 2 shows a sectional view of an exemplary MLS actuator 30 that is included in an MLS damper 25 to provide vibration damping between a sprung element 10 and an unsprung element 14 in an active suspension assembly. The suspension assembly 20 includes a load-carrying spring arranged in parallel with a magnetic lead screw (MLS) damper 25 between a sprung element and an unsprung element. As shown, the sprung element 10 is a chassis of a vehicle and the unsprung element 14 is a lower control arm supporting a wheel assembly that contacts a ground surface. Details for mounting a vehicle wheel assembly are known and thus not described herein. The suspension assembly 20 may be employed to dampen vibration between a sprung element and an unsprung element in a stationary setting with similar effect. The suspension assembly 20 incorporates the MLS damper 25 to achieve preferred suspension performance in response to static and dynamic loading to isolate the chassis 10 from vibrations and stabilize the chassis 10 during vehicle maneuvering. Static load is understood to be the magnitude of force exerted by the chassis 10 on the suspension assembly 20 and wheel assembly when the chassis 10 is at rest. Such a system provides desirable ride performance for passenger comfort and wheel/tire road grip while accommodating static load changes due to mass changes and accommodating dynamic load changes during handling maneuvers when employed on a vehicle. The terms spring rate, spring constant and stiffness are analogous terms that all refer to a change in force exerted by a spring in relation to the deflection of the spring.

The suspension assembly 20 is a load-carrying element that supports and transfers static and dynamic forces and load inputs between the unsprung element 14 and the sprung element 10, i.e., the lower control arm 14 and the chassis 10. The suspension assembly 20 may include a spring and MLS damper 25 arranged in parallel between the lower control arm 14 and the chassis 10. Under static loading conditions the MLS damper 25 is at a nominal displacement. Introduction of a dynamic load causes displacement of the MLS damper 25.

Movement of the sprung element 10 relative to the unsprung element 14 exerts either compressive or tensile force on the MLS damper 25. In either case, such compressive or tensile force causes rotation of the rotor screw 50 relative to the translator 40, and rotation of the rotor screw 50 occurs in concert with rotation of the rotor 66 of the electric motor 60. The electric motor includes a motor rotor 66 arranged within a concentric motor stator 64 that is mounted in a frame 62 that couples to the sprung member 10. The motor rotor 66 rotatably couples to the MLS rotor screw 50 via shaft 58. The electric motor 60 can operate as a motor to rotate in either the clockwise direction or the counterclockwise direction to rotate the rotor screw 50 and thus extend the length of the MLS damper 25 or shorten the length of the MLS damper 25. In addition, presence of compressive or tensile force on the MLS damper 25 can cause rotation of the rotor screw 50 relative to the translator 40, which occurs in concert with rotation of the rotor 66 of the electric motor 60. The electric motor 60 can operate as a generator in either the clockwise direction or the counterclockwise direction to rotate with the rotor screw 50 when the length of the MLS damper 25 is either extended or shortened in response to the tensile or compressive force.

Damping is introduced by controlling a rate of the linear translation of the rotor screw 50 in relation to the translator 40.

Figure 3:
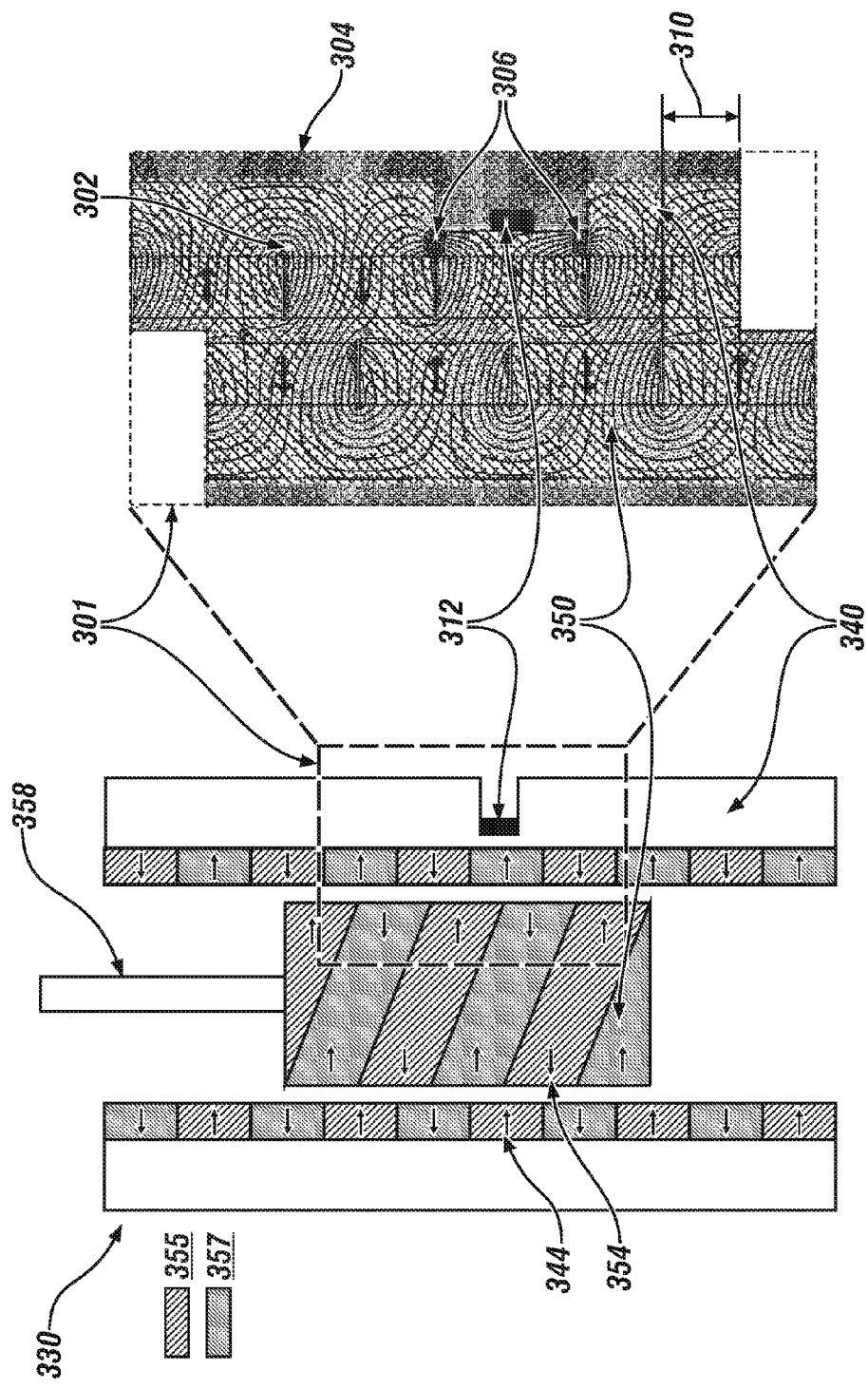
FIG. 3 illustrates a sectional view of a MLS actuator having an integrated sensor device and a magnetic flux present on a translator in the MLS actuator, in accordance with the disclosure.

FIG. 3 shows a sectional view of a MLS actuator 330 having an integrated sensor device and an expanded illustration 301 of a measured magnetic flux field 302 on the translator 340 in the MLS 330. A sensor device 312 is integrated into the translator 340 and is configured to measure a magnetic flux 302 generated by the rotor screw magnetic assembly 354 positioned on the rotor screw 350 and the translator magnetic assembly 344 positioned on the translator 340 as the rotor screw 350 rotates on rotatable shaft 358 resulting in a translation of translator 340. Polarities are shown merely for purposes of illustration of the concept, and include a north polarity portion 355 and a south polarity portion 357.

The integrated sensor device 312 can be any sensor configured to measure magnetic flux of the rotor screw magnetic assembly and the translator magnetic assembly. In an exemplary embodiment the sensor device 312 may be a Hall Effect sensor configured to output a voltage that varies in response to variations in the magnetic flux in magnetic flux field 302 on the translator 340. As the translator 340 translates along the rotor screw 350 the magnetic flux in the magnetic flux field 302 will vary between regions of high flux density 306 and regions of low flux density 304. Based on a measurement of magnetic flux 302 on the translator 340 the relative displacement 310 of the MLS 330 can be directly measured. The motion of the MLS 330 has two components. The first component is the rotational movement of the rotor screw 350. The second component is the translation of the translator 340 which can be expressed as a lead of a fixed point of the translator 340. The relative displacement can be expressed by the following equation.

$$z = \left(\frac{d}{\beta}\right) - \theta \quad [1]$$

With respect to equation 1, z is the relative displacement of MLS 330 measured in rad. $\beta$ is the gearing between the linear and rotational movement of MLS 330. d is the translation of the translator 340 and $\theta$ is the rotation of rotor screw 350. $\beta$ can be expressed by the following equation.

$$\beta = \frac{l_{lead}}{2*\pi} \quad [2]$$

With respect to equation 2, $l_{lead}$ is the linear displacement of the translator when the rotor is rotated one rotation. The linear force, or MLS force can be determined based upon a relationship with the relative displacement of the MLS 330. In an exemplary embodiment the MLS force can be expressed by the following Fourier series with first harmonics.

$$F = F_0 \sin(n_{threads} \times z) \quad [3]$$

With respect to equation 3, F is the linear or MLS force. $F_0$ is the maximum linear force that can be exerted by MLS 330, $n_{threads}$ is the number of thread starts on the MLS 330. In an exemplary embodiment the MLS 330 may have multiple thread starts. z is the relative displacement of MLS 330.

The use of an integrated sensor device within MLS 330 to directly measure magnetic flux on the translator 340 can be used to determine a relative displacement of the MLS 330 based on variations of magnetic flux 302 on the translator 340. As the translator 340 translates along rotor screw 358 the magnetic flux 302 varies. This variation is consistent based on the alignment of the magnetic polarities of the rotor screw magnetic assembly 354 positioned on the rotor screw 350 and the translator magnetic assembly 344 positioned on the translator 340. The direct measurement of relative displacement allows for a direct measurement of the linear force based on equation 2, which may be provided as feedback to an external controller and used in force control of MLS 330 to achieve a desired linear force. Additionally the measurement of relative displacement, based on a measured magnetic flux 302, serves as a mixed measurement of translation and rotation based on the relationship expressed in equation 1.

Figure 4:
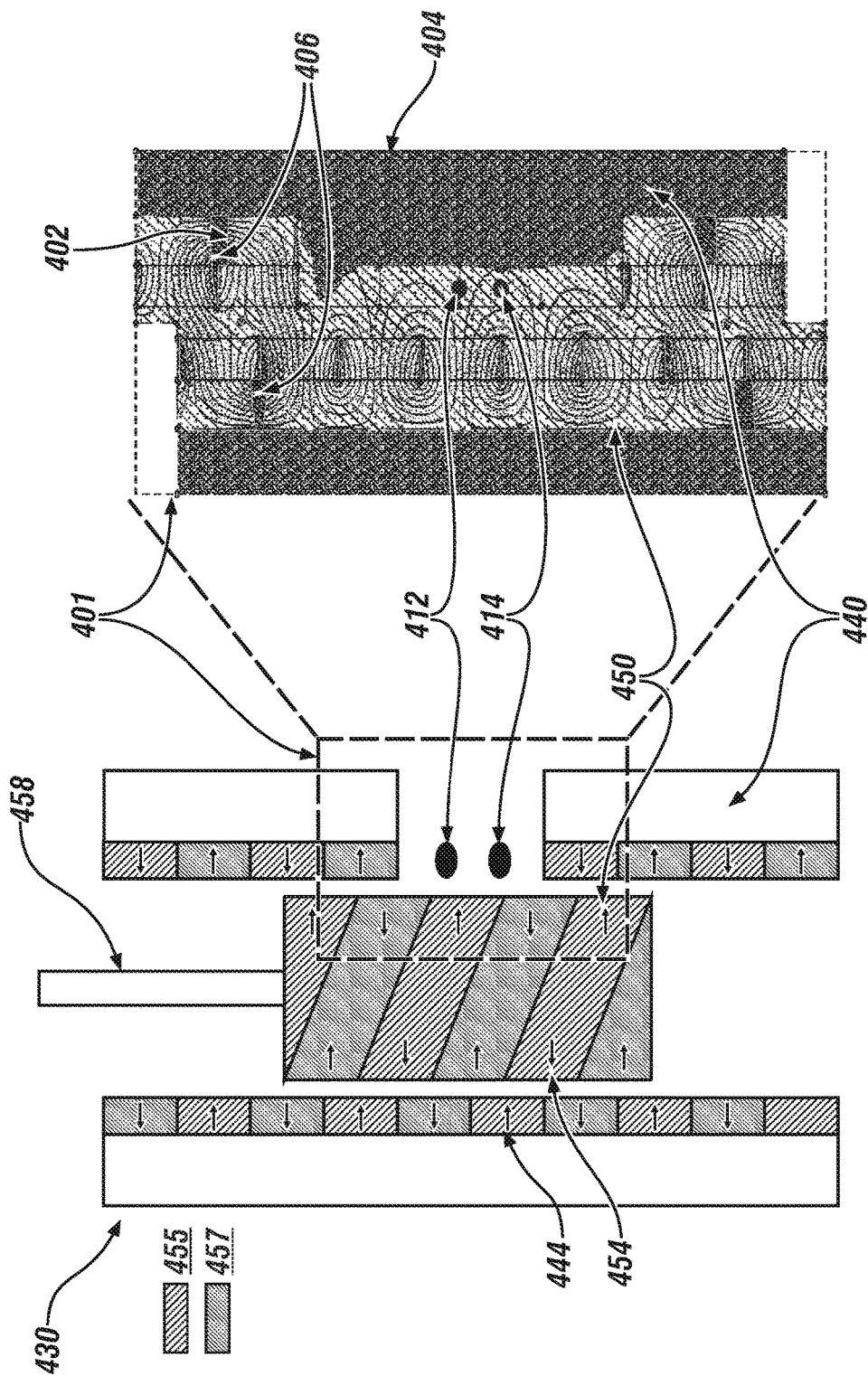
FIG. 4 illustrates a sectional view of a MLS actuator having two integrated sensor devices and a magnetic flux present on a translator in the MLS actuator, in accordance with the disclosure.

FIG. 4 shows a sectional view of an exemplary MLS actuator 430 having multiple integrated sensor devices 412, 414 and an expanded illustration 401 of a measured magnetic flux field 402 on the translator 440 in the MLS 430. A sensor device 412 is integrated into the translator 440 and is configured to measure a magnetic flux 402 generated by the rotor screw magnetic assembly 454 positioned on the rotor screw 450 and the translator magnetic assembly 444 positioned on the translator 440 as the rotor screw 450 rotates on rotatable shaft 458 resulting in a translation of translator 440. In an exemplary embodiment and as illustrated the sensors are positioned on the translator 440 in an area where no magnets of the translator magnetic assembly 444 are present. The sensor devices are configured to directly measure the flux from the rotor magnetic assembly 454. Removing a portion of the translator magnetic assembly 444 to install the two sensor devices 412, 414 will result in a small reduction in the stall force of the MLS actuator 430, however as only a portion of the thread is removed any reduction will be small. Polarities are shown merely for purposes of illustration of the concept, and include a north polarity portion 455 and a south polarity portion 457. The sensors are mounted with a phase shift of 90° such that a 90° rotation of the rotor screw 450 will result in a linear translation of the translator 440 equivalent to the distance of the spacing between the sensor devices 412, 414. Accordingly the voltage measurements of the two sensor devices 412, 414, resulting from variations in magnetic flux 402, can be utilized in directly calculating the relative displacement of the MLS 430. As the translator 440 translates along the rotor screw 450 the magnetic flux 402 will vary between regions of high flux density 406 and regions of low flux density 404. Additionally, by placing the two sensor devices 412 and 414 with a phase shift of 90° the position measurements become independent of temperature changes. The relative displacement may be expressed by the following equation.

$$z = \frac{1}{n_{threads}} * \tan^{-1}\left(\frac{A_2 \cdot (v_2 + O_2)}{A_1 \cdot (v_1 + O_1)}\right) \quad [4]$$

With respect to equation 4 $n_{threads}$ is equal to the number of thread starts on the rotor screw 450. $v_1$ is the voltage measurement from a first sensor device 412 and $v_2$ is the voltage measurement from a second sensor device 414. $A_1$ is an amplitude correction for the first sensor device 412, $A_2$ is an amplitude correction for the second sensor device 414. $O_1$ is an offset correction for the first sensor device 412 and $O_2$ is an offset correction for the second sensor device 414.

The integrated sensor devices 412, 414 can be any sensor configured to measure magnetic flux of the rotor screw magnetic assembly and the translator magnetic assembly. In an exemplary embodiment the sensor devices 412, 414 may be Hall Effect sensors configured to output a voltage that varies in response to variations in the magnetic flux 402 on the translator 440. As was discussed with respect to the MLS actuator of FIG. 3, the integration of a sensor device within the MLS actuator allows for a direct measurement of the relative displacement of the MLS actuator which may be used to determine linear force exerted by MLS actuator 430 based on the relationship expressed in equation 2.

Figure 5:
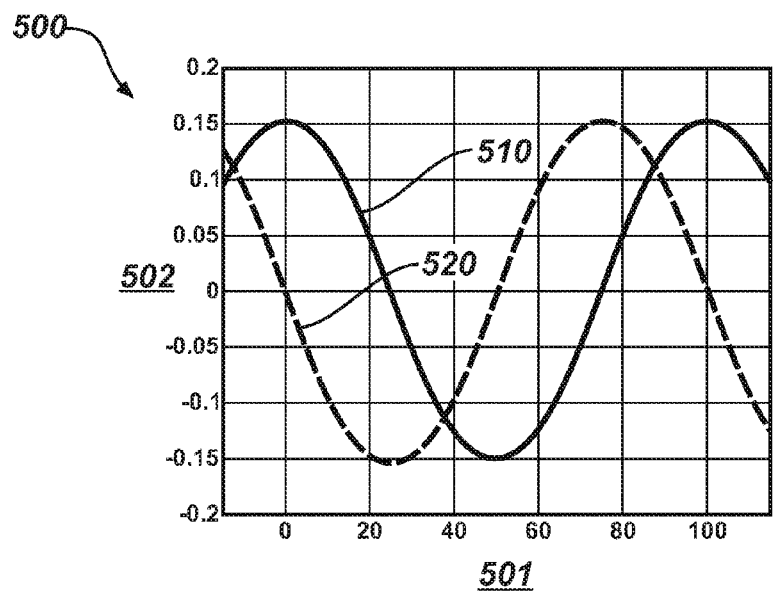
FIG. 5 illustrates a non-limiting exemplary plot of magnetic flux on a translator of an MLS actuator as measured by integrated sensor devices at two points on a translator in the MLS actuator in relation to the relative displacement of the MLS actuator, in accordance with the disclosure.

FIG. 5 illustrates a non-limiting exemplary plot 500 of magnetic flux 402 on a translator of an MLS actuator 430 as measured by sensor devices 412 and 414 of MLS actuator 430 illustrated in FIG. 4 and the corresponding relative displacement of the MLS actuator 430. The sensor devices 412, 414 are integrated within translator 440 at two consecutive points. Horizontal axis 501 depicts a relative displacement $x_{rel}$ in percentage of lead. The vertical axis 502 depicts magnetic flux $B_r$ described in milliTesla [mT]. Line 510 corresponds to the measurement of magnetic flux in relation to relative displacement as measured by sensor device 412. Line 520 depicts the measurement of magnetic flux in relation to relative displacement as measured by second sensor device 414. By using two sensor devices configured to measure magnetic flux and positioned with a phase shift of 90° such that a 90° rotation of the rotor 458 the relative displacement can be reconstructed up to a rotation of the rotor at which point the variation of magnetic flux will begin a new cycle as the oppositely magnetized magnets of the rotor magnetic assembly 454 and the translator magnetic assembly 444 come into alignment.

Figure 6:
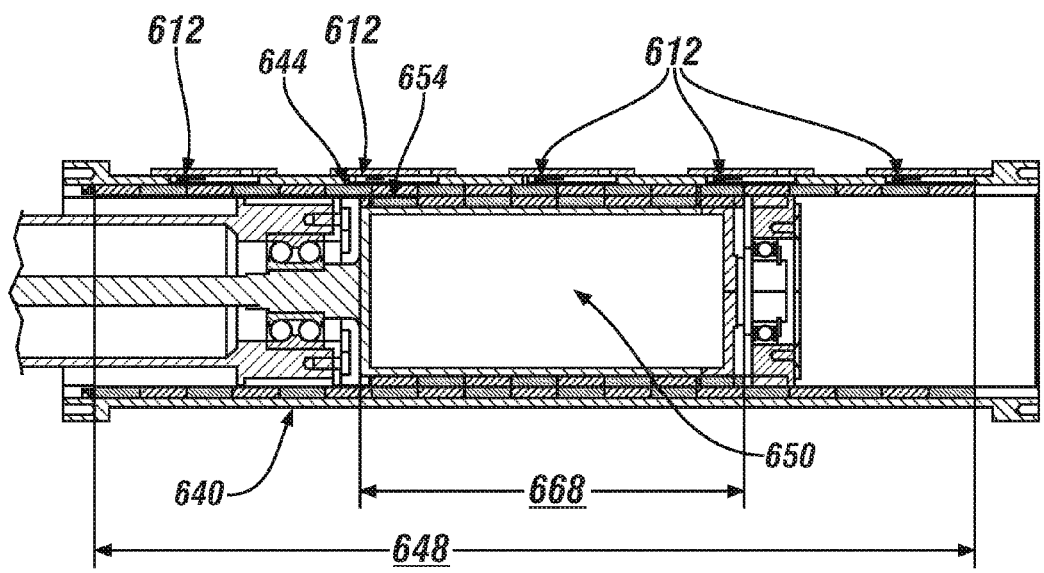
FIG. 6 illustrates a sectional view of a MLS actuator having a plurality of integrated sensor devices positioned along the translator of the MLS actuator, in accordance with the disclosure.

FIG. 6 illustrates a sectional view of a MLS actuator 630 having a plurality of integrated sensor devices 612 positioned along the translator 640 of the MLS actuator 630. By placing more sensor devices along the translator 640 the displacement, or absolute position of the translator relative to the rotor screw 650 can be measured. In an exemplary embodiment the translator magnetic assembly 644 extends the entire length 648 of the translator 640. The rotor magnetic assembly 654 extends the entire length 668 of the rotor screw 650. Placement of the sensor devices 612 along the entire length 648 of the translator 640 will allow the absolute position of the translator 640 to be determined as it translates along the rotor screw 650. The position of the translator may be tracked by sensor devices 612 positioned along the entirety of the translator 640.

Figure 7A:
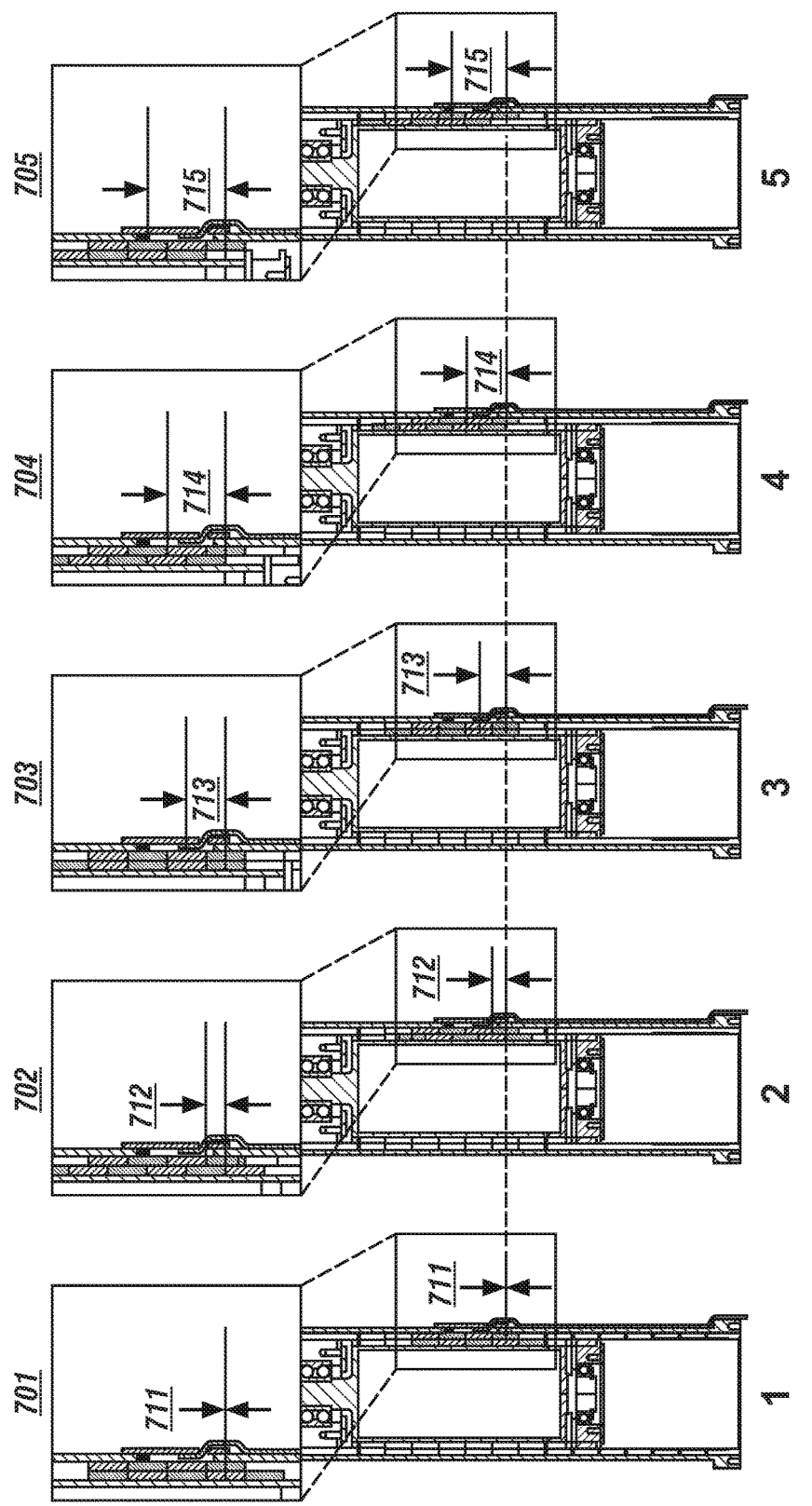
FIG. 7a illustrates a sectional view of a MLS actuator at multiple stages of relative displacement of a translator component of the MLS actuator.

FIG. 7a illustrates a sectional view of a MLS actuator at multiple stages of relative displacement of a translator component of the MLS actuator. The MLS force exerted by a MLS actuator can be described by a sine function dependent on relative displacement between a rotor and a translator as expressed by equation 2. When two opposite magnetized magnets are facing each other zero force is transferred through the MLS. At stage 701, when the relative displacement 711 is zero, the translator magnetic assembly and the rotor magnetic assembly are aligned such that the polarities of the magnets are opposite. This is described as a stage 1 magnetic alignment. At this magnetic alignment the MLS force exerted by the MLS actuator is zero. When a magnet having a north or south polarity is facing half a south polarized magnet and half a north polarized magnet a maximum force is transferred through the MLS actuator. At stage 702, when the relative displacement 712 is at 25% of a maximum relative displacement, the translator magnetic assembly and the rotor magnetic assembly are aligned such that each magnetic thread is facing half a magnet having the same polarity and half a magnet of the opposite polarity. This is described as a stage 2 magnetic alignment. The MLS force exerted by the MLS actuator is at its maximum. When a magnet is facing a magnet having the same polarity zero force is transferred through the MLS actuator and the position is unstable. At stage 703, when the relative displacement 713 is 50% of a maximum relative displacement, the translator magnetic assembly and the rotor magnetic assembly are aligned such that the magnetic threads of the translator magnetic assembly are facing magnetic threads of the rotor magnetic assembly having the same polarity. This is described as a stage 3 magnetic alignment. The MLS force exerted by the MLS actuator is zero. At stage 704 the relative displacement 714 is at 75% of the maximum relative displacement. This is described as a stage 4 magnetic alignment. As with stage 702 the translator magnetic assembly and the rotor magnetic assembly are aligned such that each magnetic thread is facing half a magnet having the same polarity and half a magnet of the opposite polarity and accordingly the MLS force exerted by the MLS actuator is at its maximum. At stage 705 the relative displacement 715 achieves 100% of the maximum relative displacement. As at stage 701, the translator magnetic assembly and the rotor magnetic assembly are aligned such that the polarities of the magnets are opposite. As with stage 701 this is described as a stage 1 magnetic alignment, and the MLS force exerted by the MLS actuator is zero.

Figure 7B:
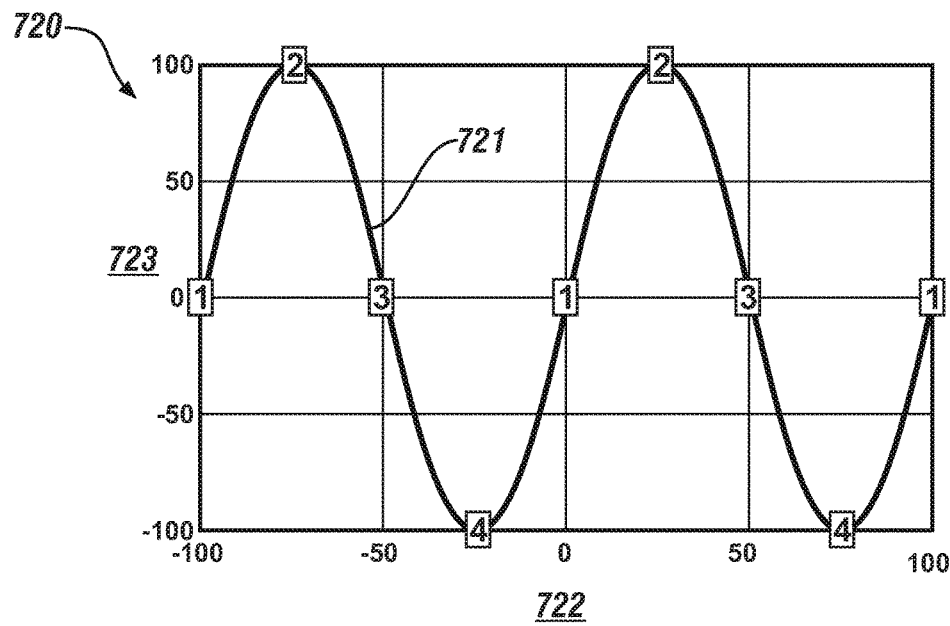
FIG. 7b illustrates a non-limiting exemplary plot of MLS force exerted by a MLS actuator described in a percentage of stall force in relation to a relative displacement between a rotor and a translator of the MLS actuator described in a percentage of lead.

FIG. 7b illustrates a non-limiting exemplary plot 720 of MLS force exerted by a MLS actuator described in a percentage of stall force in relation to a relative displacement between a rotor and a translator of the MLS actuator described in a percentage of lead. The magnetic alignment stages 1-4 corresponding to the relative displacements are additionally depicted along the sinusoidal line 721. The horizontal axis 722 depicts the relative displacement $x_{rel}$ in percentage of lead. The vertical axis 723 depicts the MLS force in percentage of stall force. As described with respect to FIG. 7a, when the relative displacement $x_{rel}$ is at zero percent of lead, as with stage 701, the translator magnetic assembly and rotor magnetic assembly are in a stage 1 magnetic alignment and the MLS force is at zero percent of a maximum stall force. When the relative displacement $x_{rel}$ is at 25% of lead, as with stage 702, the translator magnetic assembly and rotor magnetic assembly are in a stage 2 magnetic alignment resulting in a MLS force at 100% of stall force. When the relative displacement $x_{rel}$ is at 50% of lead, as with stage 703, the translator magnetic assembly and rotor magnetic assembly are in a stage 3 magnetic alignment resulting in a MLS force at zero percent of stall force. When the relative displacement $x_{rel}$ is at 75% of lead, as with stage 704, the translator magnetic assembly and rotor magnetic assembly are in a stage 4 magnetic alignment resulting in a MLS force at −100% of stall force. When the relative displacement $x_{rel}$ is at 100% of lead, as with stage 705, the translator magnetic assembly and rotor magnetic assembly are back in a stage 1 magnetic alignment resulting in a MLS force of zero percent of stall force. Based on this illustrated relationship measurement of relative displacement can be used to estimate the force transferred through the MLS.

Figure 7C:
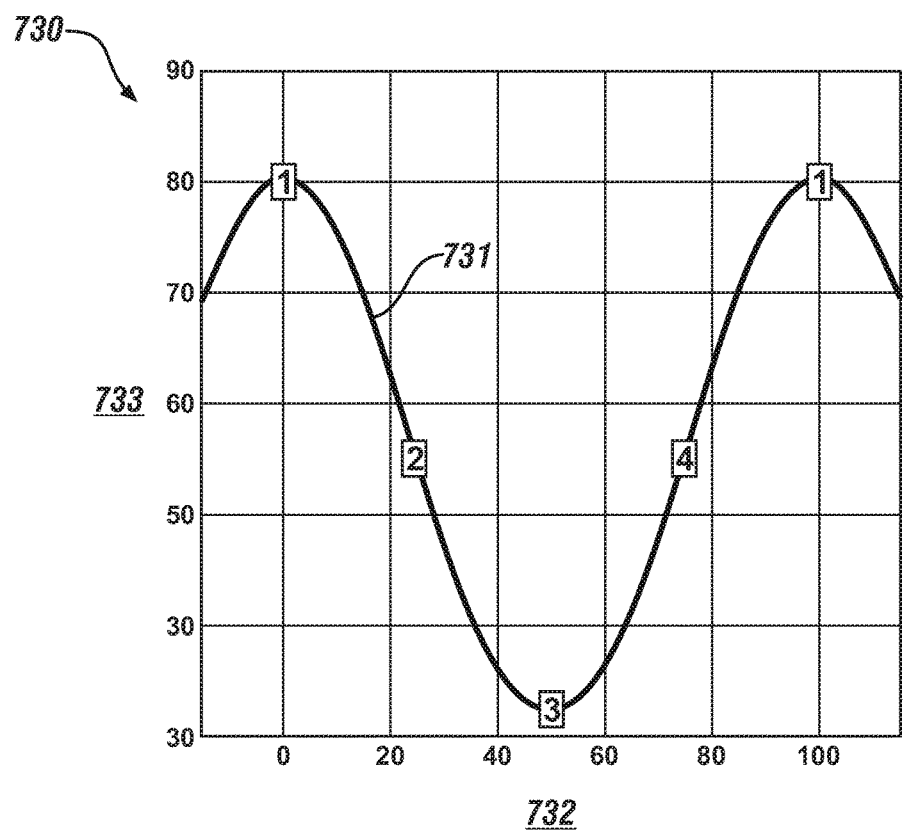
FIG. 7c illustrates a non-limiting exemplary plot of magnetic flux on a translator of an MLS actuator as measured by integrated sensor devices in relation to the relative displacement of the MLS actuator described in a percentage of lead, in accordance with the disclosure.

FIG. 7c illustrates a non-limiting exemplary plot 730 of magnetic flux on a translator of an MLS actuator as measured by integrated sensor devices in relation to the relative displacement of the MLS actuator described in a percentage of lead. The horizontal axis 732 depicts the relative displacement $x_{rel}$ in percentage of lead. The vertical axis 733 depicts the magnetic flux in milliTesla (mT). The magnetic alignment stages 1-4 corresponding to the relative displacements and magnetic fluxes are depicted along the sinusoidal line 731. This plot illustrates the correlation between relative displacement $x_{rel}$ and magnetic flux in the MLS actuator. The magnetic flux achieves maximum peak values at relative displacements resulting in a magnetic alignment stage 1 wherein the two opposite magnetized magnets are facing each other. The magnetic flux will be at a minimum peak at relative displacements resulting in a magnetic alignment stage 3 wherein two magnets with the same polarity are facing each other. Based on this relationship a relative displacement of the MLS actuator may be determined based upon a measured magnetic flux.

Figure 8:
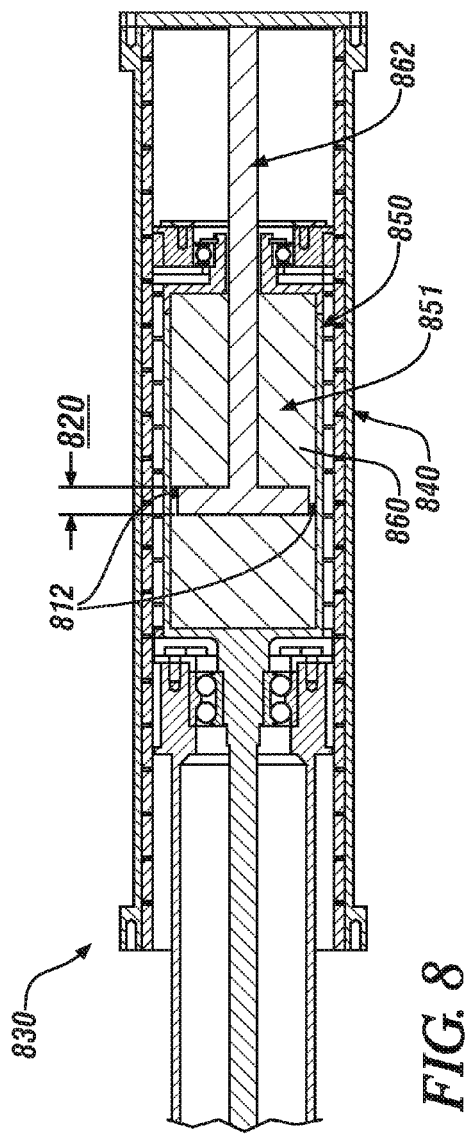
FIG. 8 illustrates a sectional view of a MLS actuator having a rotor with an internal magnetic thread and an integrated sensor device, in accordance with the disclosure.

FIG. 8 shows a sectional view of an exemplary MLS actuator 830 having a rotor screw 850 with an internal magnetic thread 851 and integrated sensor devices 812. In this embodiment, the measurements by the integrated sensor devices 812 are performed on an inner surface of the rotor screw 850. The rotor screw 850 includes an internal helically shaped magnetic thread 851 which may be of a low remenance ferrite magnet strip. The translator 840 includes an internal shaft 862 which has the same lead as the internal magnetic thread 851 and thus drives the translator 840 along the magnetic thread 851 as the rotor screw 850 rotates. Sensor devices 812 are integrated into the internal shaft 862 of the translator 840. The sensor device position is fixed to the translator 840 translation. In this embodiment the rotor screw must have a length that is larger than the stroke of the MLS actuator.

Figure 9B:
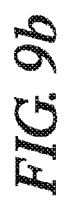
FIG. 9b illustrates a cross-sectional view of the MLS actuator of FIG. 9a, in accordance with the disclosure.
Figure 9A:
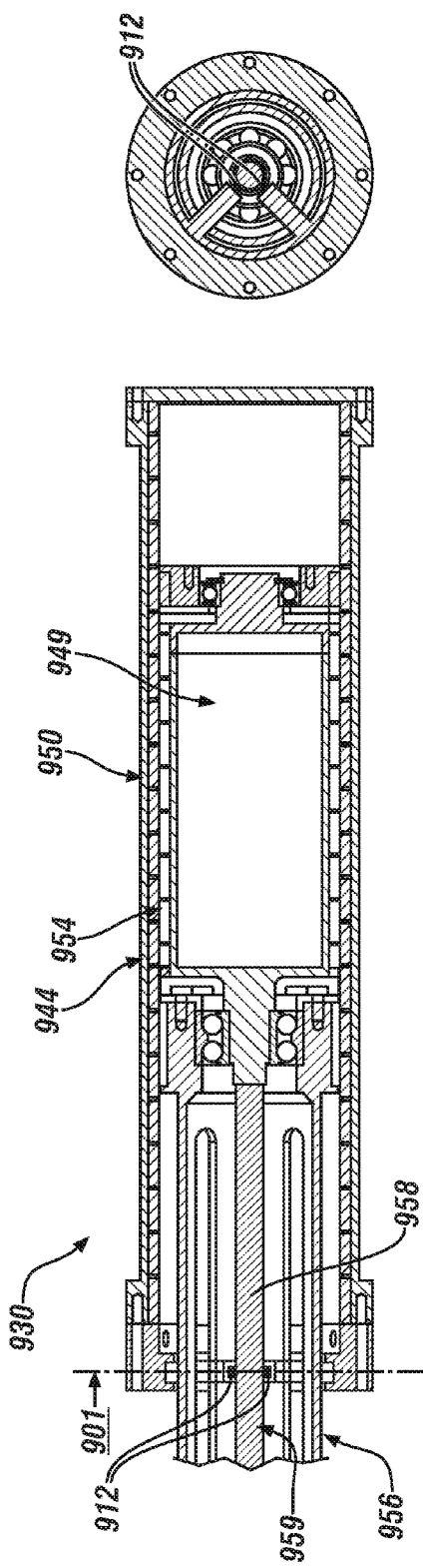
FIG. 9a illustrates a sectional view of a MLS actuator having a rotatable shaft coupled to the rotor with an outer magnetic thread on the rotatable shaft and an integrated sensor device proximate to the rotatable shaft, in accordance with the disclosure.

FIG. 9a shows a sectional view of a MLS actuator 930 having a rotatable shaft 958 coupled to the rotor 940 with an outer magnetic thread 959 on the rotatable shaft 958 and integrated sensor devices 912 proximate to the rotatable shaft 958. In this embodiment the sensor devices 912 are configured to perform measurements on an outer surface of the rotatable shaft 958 through an axial housing 956. The outer magnetic thread 959 on rotatable shaft 958 has the same lead as the force transferring thread on the rotor screw 940 and translator 950. In this embodiment the sensor device position is fixed to the translator translation.

FIG. 9b shows a cross-sectional view 901 of the MLS actuator 930 of FIG. 9a. This view details the positioning of sensor devices 912 proximate to rotatable shaft 958.

Figure 10A:
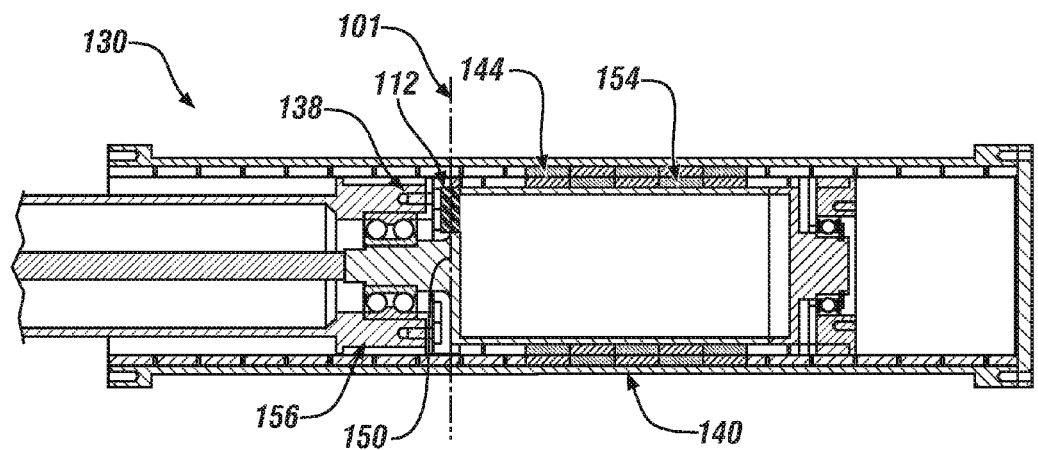
FIG. 10a illustrates a sectional view of a MLS actuator having a plurality of integrated sensor devices positioned on an axial bearing house of the MLS actuator, in accordance with the disclosure.

FIG. 10a shows a sectional view of a MLS actuator 130 having at least on integrated sensor device(s) 112 positioned on an axial bearing house 156 of the MLS actuator 130. The sensor device(s) 112 is positioned between linear guides 138 and the rotor 150 inside the translator 140 and are configured to measure magnetic flux density within the MLS actuator 130. Accordingly the measurements of magnetic flux taken by the sensor device(s) 112 is independent of an absolute linear position of the rotor 150. In an exemplary embodiment the sensor device(s) 112 is mounted on a fixture which is connected to the axial bearing house 156. The rotor 150 will rotate relative to the sensor device(s) 112 and the translator 140 will translate relative to the sensor device(s) 112. In an exemplary embodiment the sensor device(s) 112 is configured to measure magnetic flux density and the variation in magnetic flux density measured by the sensor devices is influenced from the varying flux density from both the rotor magnets 154 and the translator magnets 144 as rotation and translation occurs. At a constant MLS force the sensor device(s) 112 will measure a variation in the flux density because of the rotation and linear displacement relative to the sensor device(s) 112.

Figure 10B:
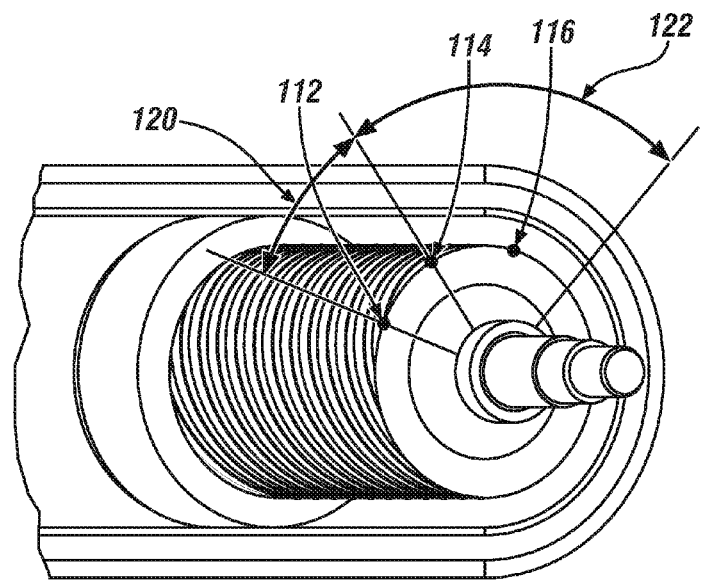
FIG. 10b illustrates a sectional view of the MLS actuator of FIG. 10a, in accordance with the disclosure.

FIG. 10b shows a sectional view of the MLS actuator of FIG. 10a at section 101. An exemplary placement of multiple sensor devices 112, 114 and 116 around the axial bearing house 156 of the MLS actuator 130 is shown. In the exemplary embodiment the sensor devices 112, 114 and 116 are Hall Effect sensors. Three Hall Effect sensors 112, 114 and 116 with an individual distance 120 of 120 electrical degrees are placed on the axial bearing house 156 to compensate for the phase shift as a function of electrical angle. Placement of the sensor devices 112, 114 and 116 at a distance of 120 electrical degrees from the next sensor device allows for obtaining a measurement of a complete magnetic period 122 with the use of three sensor devices 112, 114 and 116.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for controlling a magnetic lead screw actuator, comprising:
   a magnetic lead screw including:
      an electric machine;
      a rotor rotatably coupled to the electric machine;
      a translator;
      said rotor comprising a rotor magnet assembly forming first helical magnetic threads;
      said translator comprising a translator magnet assembly forming second helical magnetic threads;
      wherein rotation of the rotor by the electric machine effects linear translation of the translator by interaction of the first and second helical magnetic threads;
   a control module electrically operatively coupled to an electric machine controller of the magnetic lead screw actuator; and
   at least one sensor device integrated within the magnetic lead screw actuator and configured to measure a magnetic flux in the magnetic lead screw actuator indicative of a relative displacement between the rotor and the translator, said magnetic flux measurement provided as feedback to the electric machine controller.

2. The apparatus of claim 1, wherein said magnetic flux in the magnetic lead screw actuator indicative of a relative displacement between the rotor and the translator comprises a variation in magnetic flux between the rotor magnet assembly and the translator magnet assembly in the magnetic lead screw actuator.

3. The apparatus of claim 2, wherein the electric machine controller is configured to determine the relative displacement between the rotor and the translator based upon said variation in the magnetic flux.

4. The apparatus of claim 3, wherein the electric machine controller is configured to determine a magnetic lead screw force exerted by the magnetic lead screw based upon the determined relative displacement between the rotor and the translator.

5. The apparatus of claim 4, wherein the electric machine controller is configured to determine the magnetic lead screw force exerted by the magnetic lead screw based upon the following equation:

$$F = F_0 \sin(n_{threads} \times z)$$

wherein

F is the magnetic lead screw force;

F0 is a maximum magnetic lead screw force;

$n_{threads}$ is the number of thread starts on the magnetic lead screw; and z is the relative displacement between the rotor and the translator.

6. The apparatus of claim 1, wherein the at least one sensor device comprises a magnetic flux sensor located on the translator and configured to measure magnetic flux on the translator.

7. The apparatus of claim 1, wherein the at least one sensor device comprises two magnetic flux sensors located on the translator with a phase shift of 90° and configured to measure magnetic flux on the translator.

8. The apparatus of claim 7, wherein the electric machine controller is configured to determine the relative displacement between the rotor and the translator based upon the sensor device feedback.

9. The apparatus of claim 1, wherein the at least one sensor device comprises a plurality of sensor devices located on the translator and spanning a length of the translator, and wherein the electric machine controller is configured to determine the absolute position of the translator based upon the sensor device feedback.

10. The apparatus of claim 1, wherein the at least one sensor device is a Hall effect sensor.

11. The apparatus of claim 1, wherein the at least one sensor device is located on an axial bearing house of the magnetic lead screw actuator.

12. The apparatus of claim 1 wherein said at least one sensor device is configured to measure a time derivative of the relative displacement between the rotor and the translator.

13. A method of controlling a magnetic lead screw actuator comprising a rotor including a rotor magnet assembly, and a translator including a translator magnet assembly, the method comprising:
  monitoring at least one sensor device configured to measure magnetic flux in a magnetic lead screw actuator;
  determining the relative displacement between the rotor and the translator based upon the variation in the measured magnetic flux in the magnetic lead screw actuator; and
  controlling the magnetic lead screw actuator based upon the determined relative displacement between the rotor and the translator.

14. The method of claim 13 further comprising determining a magnetic lead screw force exerted by the magnetic lead screw based upon the determined relative displacement of the magnetic lead screw actuator.

15. The method of claim 13 wherein controlling the magnetic lead screw actuator based upon the determined relative displacement between the rotor and the translator comprises:
  determining a magnetic lead screw force exerted by the magnetic lead screw based upon the relative displacement between the rotor and the translator; and
  generating an electric machine control command for achieving a desired linear force from the magnetic lead screw actuator based upon the determined magnetic lead screw force.

16. The method of claim 13 further comprising determining a derivative of a magnetic lead screw force exerted by the magnetic lead screw based upon the determined relative displacement between the rotor and the translator.

17. The method of claim 13 further comprising monitoring a rotational measurement of the rotor and determining an actual displacement of the magnetic lead screw actuator based upon the determined relative displacement between the rotor and the translator, and the rotational measurement of the rotor.

18. The method of claim 13 wherein monitoring at least one sensor device configured to measure magnetic flux in the magnetic lead screw actuator comprises monitoring a plurality of sensor devices configured to measure magnetic flux in the magnetic lead screw actuator, said plurality of sensor devices positioned lengthwise along the translator.

19. The method of claim 18 further comprising determining absolute displacement between the rotor and the translator based upon the magnetic flux measurements from the plurality of sensor devices configured to measure magnetic flux in the magnetic lead screw actuator.

20. An apparatus for controlling a magnetic lead screw actuator comprising:
  a magnetic lead screw including:
    an electric machine;
    a rotor rotatably coupled to the electric machine;
    a translator;
    said rotor comprising a rotor magnet assembly forming first helical magnetic threads;
    said translator comprising a translator magnet assembly forming second helical magnetic threads;
    wherein rotation of the rotor by the electric machine effects linear translation of the translator by interaction of the first and second helical magnetic threads;
  at least one sensor device integrated within the magnetic lead screw actuator and configured to measure a magnetic flux in the magnetic lead screw actuator indicative of a relative displacement between the rotor and the translator, said magnetic flux measurement provided as feedback to an electric machine controller;
  the electric machine controller including a control module configured to:
    monitor the at least one sensor device configured to measure a magnetic flux in the magnetic lead screw actuator;
    determine the relative displacement between the rotor and the translator based upon a variation in the measured magnetic flux in the magnetic lead screw actuator;
    generate an electric machine control command based upon the determined relative displacement between the rotor and the translator; and
    control the electric machine to operate at the generated electric machine control command.

* * * * *